May 30, 1933.  E. J. MADDEN  1,911,634
BRAKE
Filed Dec. 28, 1928  2 Sheets-Sheet 1

INVENTOR.
Edward J. Madden
BY
Francis W. Hardesty
ATTORNEY.

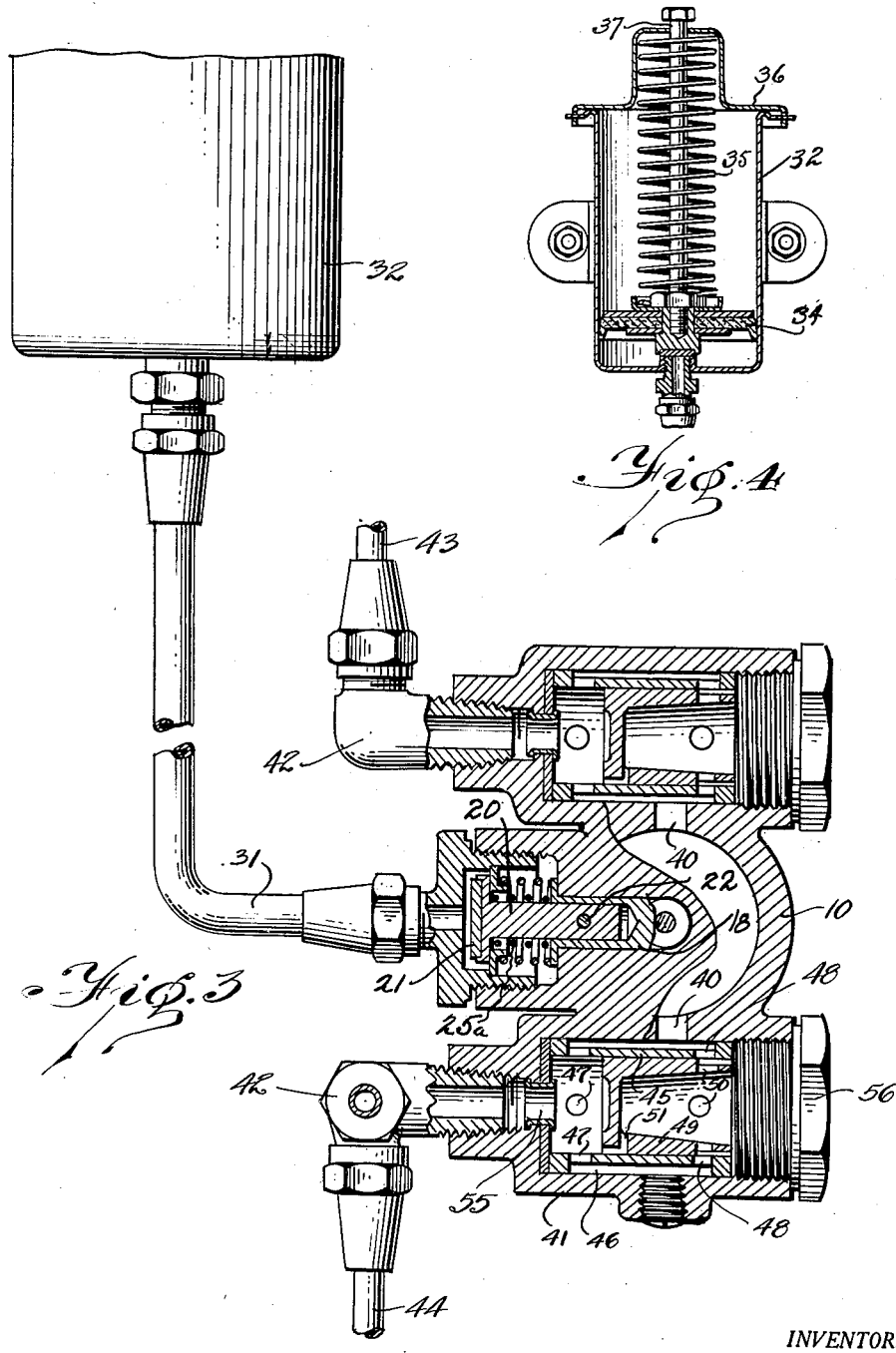

Patented May 30, 1933

1,911,634

UNITED STATES PATENT OFFICE

EDWARD J. MADDEN, OF BRIDGEPORT, CONNECTICUT

BRAKE

Application filed December 28, 1928. Serial No. 328,907.

The present invention relates to fluid pressure brakes for vehicles and more especially to master cylinders therefor and to means for maintaining the system completely filled with fluid.

Among the objects of the invention is means by which fluid is allowed free flow into the system when the brakes are idle, to thereby compensate for losses by leakage.

Another object is means to prevent loss of braking facilities in case of rupture of one of the conduits leading to one or a pair of brakes, the other one or pair being maintained in operative condition.

Still other objects will readily appear to those skilled in the art upon reference to the following description and the accompanying drawings in which Fig. 1 is a side elevation, with part in central vertical section, showing the master cylinder.

Fig. 3 is a vertical section on line 3—3 of Fig. 2.

Fig. 4 is a vertical section of the refill or reserve tank.

Figure 1:
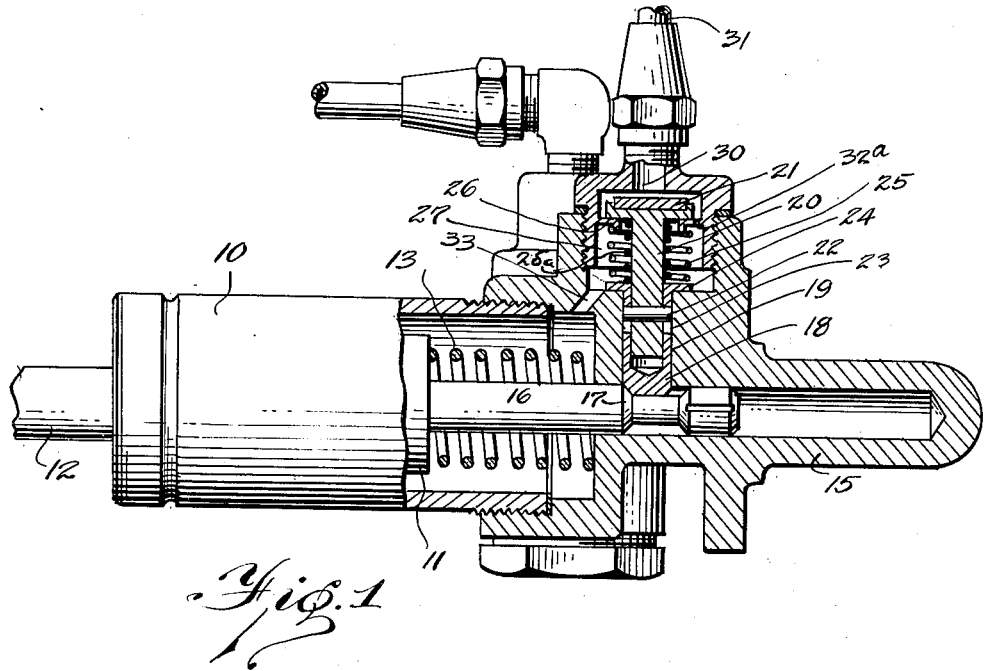

In the drawings the master cylinder for operating brakes of an automobile, for example, is shown with the valve construction that forms the subject matter of the present application.

The master cylinder is shown at 10 and has therein a suitable piston 11 operable through a piston rod 12. The piston is returned to idle position through the use of a heavy spring 13 inside of the cylinder 10. At the closure end of cylinder 10 there is provided an extension 15 in which operates a rod or cam member 16.

This cam member 16 is fixed to the piston 11 and near its free end is reduced in diameter with the shoulder thus formed providing a cam surface 17 adapted to actuate a small piston 18 operating in the guide 19 formed in the cylinder head. The member 18 is hollow for a great portion of its length to receive the stem 20 of valve 21 and the latter is maintained in the member 18 by means of a pin 22 passing through the valve stem and through slots 23 in the side walls of the former, the inner spring 25a being provided to hold the valve 21 and the member 18 in extended relation under ordinary conditions. An outer spring 25 is provided which spring coacts with a flange 24 provided on the member 18 and at its other end with a spider 26 fixed in the space 27 around the valve stem 20. By providing the spring 25a to hold the two elements in extended relation when the valve is open, a certain amount of inaccuracy in the longitudinal dimensions of the parts may be permitted. Without such an arrangement the extreme accuracy that would be required would render the device difficult to make and keep in operative condition.

The valve 21 is adapted to control the passage 30 leading into pipe 31 to reservoir 32 shown in Figs. 3 and 4 containing a supply of fluid adapted to maintain the brake system full at all times, and also to maintain a light pressure on the fluid therein.

In order to provide for the latter function, the tank 32 is provided with a piston 34 spring pressed downwardly by a spring 35 abutting against the piston and against the top 36 of the tank, a suitable guide rod 37 being provided to maintain the piston against tipping. Incidentally, the rod 37 will provide an indicator of the amount of fluid in the tank.

When the piston 11 is in its retracted position the rod 16 permits member 18 to drop to its lowest position through the action of spring 25 and thus opens valve 21, whereupon fluid from pipe 31 may enter through opening 30, past the valve and through openings 32a in spider or in flange 26 into the space 27 and through passage 33 into cylinder 10. When the piston 11 is pushed forward in the cylinder 10 its first action is to close valve 21 in an obvious manner. Its next operation or action is to force fluid through passageway 40 through the valve housings 41 and out through the connections 42 to the brakes. In the present construction there is a single pipe line 43 to each of four brakes not shown, but only two valve housings 41 are provided, the brakes being connected to the master cylinder in pairs which may be arranged as desired. In one case, one pair may include the two front brakes and the other pair will include the two rear brakes. In another case, one pair may include the left front brake and the right rear brake, while the other pair will include the right front brake and the left rear brake. In any event it is desirable that if one member of a pair becomes inoperative through loss of fluid, the other member of the same pair also should become inoperative, the other pair at the same time being maintained operative. Of course, in such instances the braking ability is greatly reduced, but nevertheless the vehicle is provided with the braking effect of the other two brakes and may be stopped in the usual manner although perhaps not so easily.

Figure 2:
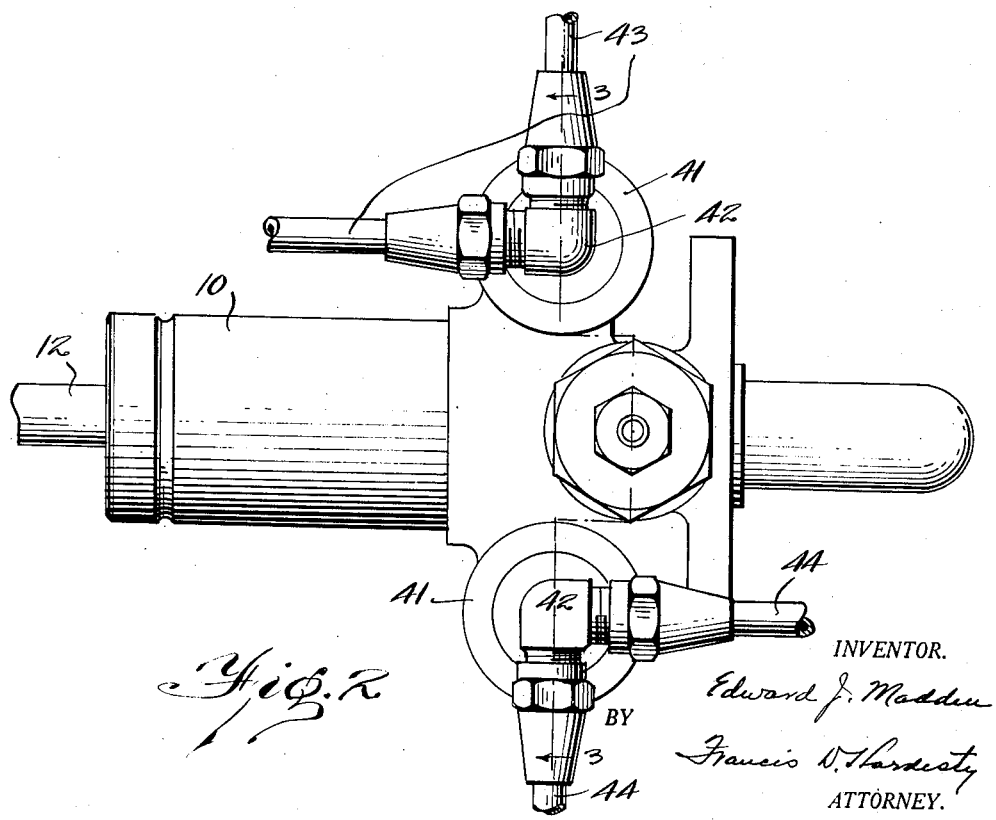
Fig. 2 is a plan view of the same.

In Fig. 2 the pairs of brakes are connected to the master cylinder unit each being connected through a fitting 42 to one of the valve housings 41, for example, the pipes 43 leading to one pair of brakes while the pipes 44 lead to the other pair.

In Fig. 3 is shown the means for maintaining one pair of brakes effective when something happens to the other pair and thus puts it out of operation.

In the housing 41 to one end of which is connected the fitting 42 there is a sleeve 45, cut away on the outside as at 46 to provide an annular chamber, connected through passage 40 to the cylinder 10. This sleeve is also provided with openings 47 which communicate with the interior thereof at the end nearest the fitting 42 and the other openings 48 allow communication also between chamber 46 and the interior of the sleeve at the other end thereof. Within the sleeve 45 is a small piston 49 having openings 50 registering with the openings 48 and having a passage-way 51 in its head affording communication between the interior of the piston and the outlet end of the sleeve and located to one side of the center of the piston head, this passage 51 being provided to permit escape of air during the filling operation.

The action of this mechanism is as follows: When the pipe line, for example, one of the pipes 44 is broken, this immediately allows the pressure in the line to drop to such a point that pressure on the foot pedal operating the piston in cylinder 10 or the pressure from tank 32 caused by spring 35, causes free flow of liquid into the housing 41 and the very great difference of pressure on the two sides of piston 49 immediately cause the latter to move toward the outlet end of the housing and cover the port 55 leading to fitting 42 so as to shut off the flow of liquid through the pipes 44.

Without the great difference in pressure caused by the leak in the pipe leading to the brake the pressure on the two sides of piston 49 is balanced and there is no tendency for the latter to move. When, of course, the piston 49 has moved and shut off the flow into fitting 42 pressure from the cylinder 10 holds it securely on its seat over the port 55 and maintains the latter shut tight.

The sleeve 45 and piston 49 are held in position within the housing 41 by means of screw plugs 56.

Now, having described the invention and the preferred forms of embodiment thereof, it is to be understood that the said invention is to be limited not to the specific details herein described and illustrated, but only by the scope of the claim which follows.

I claim:—

In a fluid pressure four wheel brake construction, a master cylinder unit having two pairs of conduits attached thereto and leading to the two pairs of brakes, said conduits being adapted to receive fluid from said cylinder, an operating piston in said cylinder, means to shut off the flow to one pair of said conduits and permit flow to the other pair of said conduits when any part of the first mentioned pair of conduits becomes broken or subject to excessive leakage, said means comprising separate connections between each pair of said conduits and said cylinder, each connection having a piston valve member therein provided with means normally balancing the fluid pressure on both sides thereof to maintain said valve member open, but adapted, upon the arising of an unbalance of pressure to move to close the connection conduit against entrance of fluid from the master cylinder.

EDWARD J. MADDEN.